March 23, 1954
R. E. CROSS
2,672,675
LOCATING AND CLAMPING MECHANISM
Filed Feb. 4, 1950
2 Sheets-Sheet 1
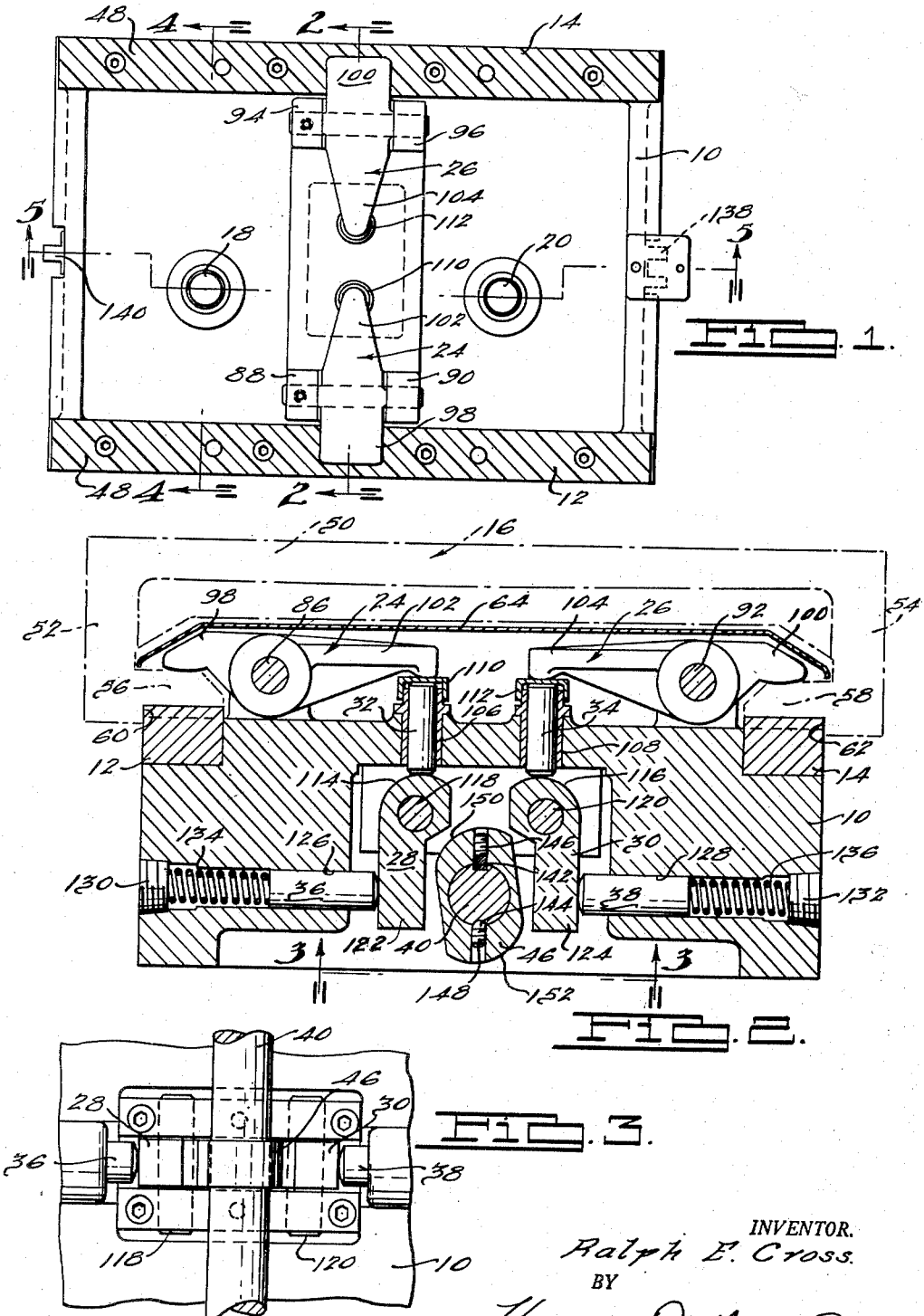
INVENTOR.
Ralph E. Cross.
BY
Harness, Dickey & Pierce.
ATTORNEYS.

INVENTOR.
Ralph E. Cross.
BY
Harness, Dickey & Pierce.
ATTORNEYS.

Patented Mar. 23, 1954

2,672,675

UNITED STATES PATENT OFFICE 2,672,675

LOCATING AND CLAMPING MECHANISM

Ralph E. Cross, Grosse Pointe, Mich.

Application February 4, 1950, Serial No. 142,517

18 Claims. (Cl. 29—1)

This invention relates to fixture locating and clamping apparatus for machine tools.

In practice, work is transferred to a machine tool either manually or automatically by suitable mechanical means. Once in the machine the work is located accurately with respect to the tool which is to act on the work and is securely clamped in the located position.

It is conventional to locate and clamp the work by separate instrumentalities using hydraulic or pneumatic cylinders. Thus, in multistation machines there are two or three cylinders for each station. Ordinarily, each cylinder requires a separate, electrically operated valve which in turn requires a series of electrical relays to properly interlock the locating and clamping of the work with the machine cycle. When it is considered that a number of machine tools may be mounted side by side and interconnected in operation, it will be readily appreciated that a large number of mechanical and electrical parts are required to properly correlate the various locating and clamping mechanisms and to correlate these mechanisms with the machine cycles. The large number of parts thus required and the intricate interconnection of the several mechanisms may be a constant source of trouble, and the large number of parts adds to the total cost of the machine. Electrical connections may be disrupted or become faulty. Hydraulic apparatus develops leaks and frequently is difficult to service. When trouble develops in these parts the machines must be shut down and valuable production time is lost.

An important object of the present invention is to provide a locating and clamping unit that will simplify the control circuits in multiple-station machines.

Another object of the invention is to provide a locating and clamping mechanism adapted for a single machine tool which is uniquely constructed so that a plurality of such apparatuses can be easily assembled together in multiple-station machines.

Still another object of the invention is to provide a work-locating and clamping apparatus that will accurately locate and clamp a series of work-holding fixtures with a single movement.

Other objects and advantages of the invention will be apparent during the course of the following description.

In the drawing forming a part of this specification and wherein like numerals are employed to designate like parts throughout the same:

Fig. 1 is a top plan view of a fixture-locating and clamping mechanism embodying the invention;

Fig. 2 is a transverse, vertical, sectional view taken on the line 2—2 of Fig. 1;

Fig. 3 is a fragmentary, bottom plan view looking in the direction of the arrows 3—3 in Fig. 2;

Figure 4:
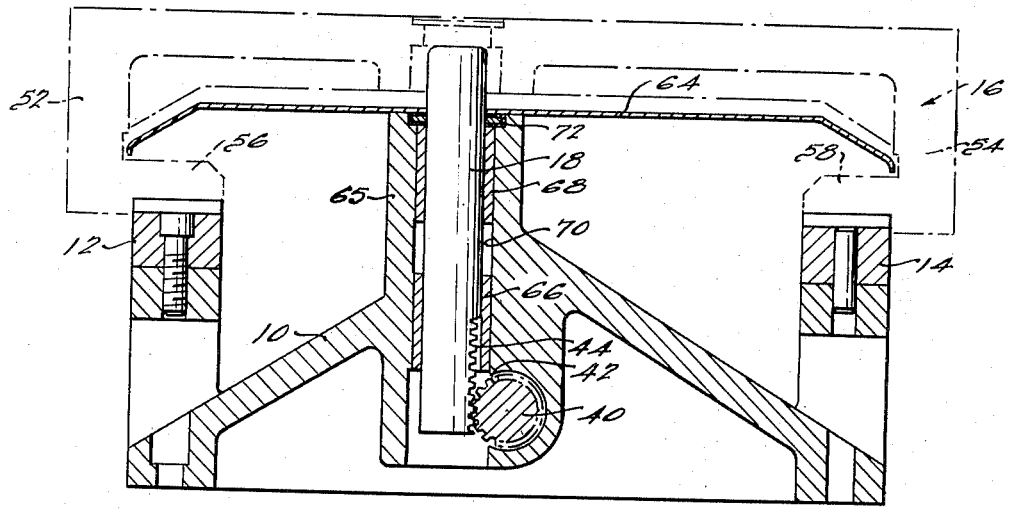
Fig. 4 is a transverse, vertical, sectional view taken on the line 4—4 of Fig. 1.

Considered in certain of its broader aspects the locating and clamping mechanism embodying the instant invention comprises a base 10 having laterally spaced, parallel, longitudinal rails or ways 12 and 14 which support or guide a pallet 16 or the like shown in broken lines in the drawing. In practice, the base 10 is adapted to be mounted in front of a machine tool or the like and the pallet 16 carries work which is to be acted upon by the tool of the machine. If desired, a plurality of the bases 10 can be arranged side by side in a multiple-station machine setup, and the pallet can be moved progressively from base to base either manually or automatically by suitable mechanical means.

Figure 5:
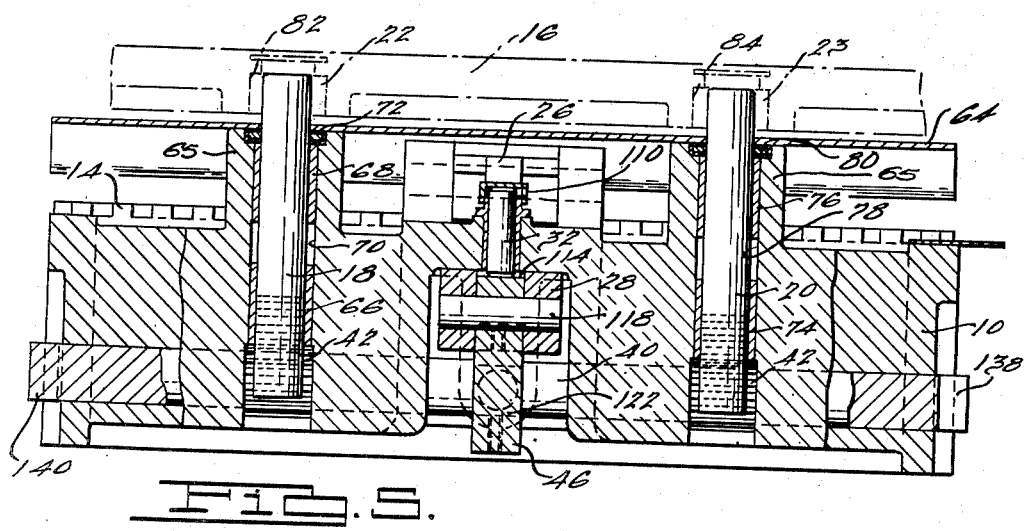
Fig. 5 is a longitudinal, vertical, sectional view taken on the line 5—5 of Fig. 1.

At opposite ends of the base 10 and slightly offset from the longitudinal center line thereof are locating bolts 18 and 20. These bolts normally are retracted to permit free, unobstructed passage of the pallet 16 across the base 10 and are projectable upwardly from the base into suitably located bushings or openings 22 and 23 respectively (Fig. 5) to locate the pallet properly with respect to the tool of the associated machine.

After the pallet 16 is properly located it is necessary to clamp it solidly on the base for the machining operation in order to relieve the locating bolts 18 and 20 of excessive strain and to hold the pallet 16 and the work carried thereby absolutely stationary. To this end, the base 10 is equipped with a pair of laterally spaced clamps 24 and 26 which are engageable with the runners of pallet 16 to press the same solidly against the ways 12 and 14. The clamps 24 and 26 are moved between engaged and released positions by cams 28 and 30 which act through slidable pins 32 and 34 respectively, and the cams are normally positioned to engage the clamps with the pallet 16 by spring-loaded plungers 36 and 38. Manifestly, the clamping force exerted against the pallet 16 by clamps 24 and 26 depends upon the contour of cams 28 and 30 and upon the spring pressure exerted against plungers 36 and 38.

As suggested, it is a feature of this invention that the locating pins 18 and 20 and clamps 24 and 26 are operated simultaneously and in proper sequence by a single movement of a single actuator. Also, when a plurality of the bases are assembled in a multiple-station machine in the manner hereinabove described, the single actuator means of the several bases can be interconnected so that all the locating bolts and all the clamps can be operated simultaneously and in unison. Thus, by reason of the unique construction and arrangement of parts I have greatly simplified the mechanism required to locate and clamp the work and have thus reduced to a minimum the possibility of shutdown due to mechanical failure or faulty operation in this mechanism.

The single actuator here shown comprises a rotatable shaft 40 which extends longitudinally through the base laterally of locating bolts 18 and 20 and substantially midway between cams 28 and 30. Gear means 42 on the shaft 40 engage racks 44 on the bolts 18 and 20 so that rotation of the shaft raises and lowers the bolts. In so far as the clamping mechanism is concerned, it will be observed (Fig. 2) that a cam 46 is keyed or otherwise fixed on the shaft 40 intermediate cams 28 and 30. When the cam 46 is positioned as shown in Fig. 2, it is entirely disengaged from cams 28 and 30 so that the spring-loaded plungers 36 and 38 are free to hold the clamps 24 and 26 engaged with the pallet 16. However, when shaft 40 is rotated in a counterclockwise direction as viewed in the drawing, cam 46 engages and pivots cams 28 and 30 so as to retract plungers 36 and 38. As cams 28 and 30 pivot, the cam surfaces progressively relieve the pressure exerted against pins 32 and 34 so that clamps 24 and 26 disengage the pallet 16. Manifestly, as shaft 40 is rotated to release clamps 24 and 26 it also lowers locating bolts 18 and 20 to disengage the pallet 16. When both the clamps and the locating bolts are disengaged from the pallet 16, the latter is free to move on the ways 12 and 14. In this connection it should be pointed out that when shaft 40 is rotated in a reverse direction to that indicated above to locate and clamp a pallet 16, cam 46 remains engaged with cams 28 and 30 during initial rotative movement of the shaft, and during this initial movement pins 18 and 20 are moved upwardly to locate the pallet. Thus, the pallet 16 is located properly on the base before the clamps 24 and 26 are engaged therewith. After the pallet 16 has been properly located, cam 46 disengages cams 28 and 30 so that the spring-loaded plungers 36 and 38 can pivot cams 28 and 30 to engage clamps 24 and 26 with the pallet.

For convenience, a more detailed description of the several parts is now given. The particular base 10 here shown is of generally rectangular shape in plan. It preferably is a casting and is suitably constructed to support the several parts hereinabove described. Also the base is suitably cored out to maintain its weight and cost as low as possible consistent with adequate strength and rigidity.

The rails 12 and 14 extend along opposite sides of the base 10 with the top surfaces thereof projecting slightly above the top surface of the base. Also in this connection it will be observed that the rails 12 and 14 are formed throughout the entire length thereof with grooves 48 which extend diagonally across the top surfaces thereof. These grooves receive dirt, chips and other particles which otherwise might accumulate between rails and the pallet 16 and score or otherwise damage the coacting surfaces of the parts. Thus, shavings or chips which accumulate on the ways during machining or other operations are pushed into the grooves 48 by the pallet as it is moved across the base 10. Foreign particles which accumulate in the grooves 48 offer no obstruction to passage of the pallet 16, and they may be suitably disposed of from time to time.

It will be readily apparent that the pallet 16 comprises no part of the present invention and it is here shown merely to illustrate the function and utility of the locating and clamping mechanism. The particular pallet 16 here shown by way of illustration has a top deck 50, depending side flanges 52 and 54, and runners 56 and 58 which extend inwardly from the lower edges of the respective flanges. The runners 56 and 58 travel on ways 12 and 14 respectively as shown in Fig. 2, and they preferably are formed with longitudinal shoulders 60 and 62 which slidably embrace against the outer sides of the ways 12 and 14 so as to guide the pallet 16 during its travel across the base 10. A guard 64 carried by the base 10 covers the ways 12 and 14 as well as the locating and clamping mechanisms on the base and assists in preventing chips and the like from falling on the ways or interfering with the operation of the mechanism. As perhaps best shown in Figs. 4 and 5, the guard 64 is mounted on upright embossments 65 comprising a part of the base 10 and forming a part of the mounting for the locating pins 18 and 20. In fact the locating pins 18 and 20 extend upwardly through the embossment 65 and the guard 64 to engage the locating bushings 22 and 23 of the pallet 16.

The locating bolt 18 is supported for vertical sliding movement by bushings 66 and 68 in a vertical bore 70 of the base 10. A seal 72 preferably is provided around the pin 18 at the upper end of bore 70 to assist the guard 64 in preventing chips or dirt from entering the spaces between the bolts and the supporting bushings. The locating bolt 20 is similarly supported by bushings 74 and 76 in a bore 78 of the base 10, and the upper end of the bore is similarly closed by a seal 80. Locating bolts 18 and 20 preferably enter hardened and ground bushings 82 and 84 respectively to position or locate the pallet fixture 16.

The clamp 24 is rockably mounted on a horizontal pivot 86 between spaced supports 88 and 90 which extend upwardly from the base 10, and the clamp 26 is similarly rockably mounted on a horizontal pivot 92 between laterally spaced supports 94 and 96 on the base 10. As perhaps best shown in Fig. 1, the two clamps 24 and 26 are aligned transversely on the base. Clamping jaws 98 and 100 extend outwardly from pivots 86 and 92 to engage the runners 56 and 58, and operating arms 102 and 104 extend inwardly from the pivots and above pins 32 and 34 respectively. As suggested, pins 32 and 34 are mounted for vertical sliding movement in bushings 106 and 108 and are located directly under the inner ends of respective arms 102 and 104. Caps 110 and 112 surmounting pins 32 and 34 fit slidably over the upper ends of bushings 106 and 108 to prevent dirt and the like from having access between the pins and the bushings. As shown in Fig. 2, the inner ends of arms 102 and 104 seat directly on the caps 110 and 112 at all times and the lower ends of the pins 32 and 34 ride on eccentric cam surfaces 114 and 116 of cams 28 and 30 respectively.

The two cams 28 and 30 in turn are mounted for pivotal movement about horizontal pivots 118 and 120 respectively, and the cams are formed with depending arm portions 122 and 124. The cam surfaces 114 and 116 are disposed eccentrically to pivots 118 and 120 so that the distance between the cam surfaces and the pivotal axes becomes progressively less as the cams pivot inwardly toward each other. Thus, as the cams roll inwardly, they progressively reduce the pressure against pins 32 and 34 and gradually release clamps 24 and 26. Conversely, the distance between cam surfaces 114 and 116 and the pivotal axes becomes progressively greater as the cam surfaces pivot outwardly away from each other. Accordingly, as cams 114 and 116 move in this manner they apply progressively increasing pressure against the pins 32 and 34 to move clamps 24 and 26 into clamping engagement with the runners 56 and 58.

Pins 36 and 38 project inwardly from horizontal bores 126 and 128 provided in the base 10, and the inner ends of the pins seat against the cam arms 122 and 124. The outer ends of bores 126 and 128 are closed by plugs 130 and 132 respectively. Springs 134 and 136 confined between plugs 130 and 132 and pins 36 and 38 urge the latter into pressed engagement with the cam arms 122 and 124 and normally hold the clamps 24 and 26 positioned to engage the pallet runners 56 and 58.

The shaft 40 is journaled in any suitable manner for rotation in the base 10, and the terminal portions thereof project from the base for coupling with corresponding shafts of adjacent units in multiple station machines. One end is here shown provided with a female coupling 138 and the opposite end is provided with a male coupling 140. The gear means 42 which engage racks 44 on locating pins 18 and 20 conveniently may comprise splined sections on the shaft. This construction is shown in the drawings. It will be readily apparent, however, that if necessary or desirable, separate gears may be mounted on the shaft 40 for engagement with the racks 44. The cam 46 is held in fixed association with shaft 40 by keys 142 and 144 and set screws 146 and 148. Cam surfaces 150 and 152 at diametrically opposite sides of the cam 46 engage cam arms 122 and 124 and operate in the manner hereinabove described to engage and release the clamps 24 and 26.

It may thus be seen that I have achieved the objects of my invention. The various parts of the unitary locating and clamping mechanism hereinabove described are so assembled and correlated that a plurality of the mechanisms can be placed side by side in series relation and connected together for mutual operation. A contributing factor is the fact that all moving parts of the mechanism are operated by a single shaft which extends the full length of the unit and projects from opposite ends thereof for ready connection to similar adjacent mechanisms. Further in connection with the above, the spatial and co-ordinative relation of the locating devices and the clamping devices with the operating shaft is largely responsible for positioning and clamping the fixture in proper sequential order as well as for disengaging the clamps and the positioning device from the fixture after the workpieces have been machined. By reason of the fact that actuation of the various devices and mechanisms is entirely mechanical, positive operation is assured and the entire apparatus is kept relatively simple. Complicated controls are eliminated and attendant difficulties due to failure of some part of the control mechanism which particularly characterize hydraulic and electrical control circuits are avoided.

Having thus described the invention, I claim:

1. Locating and clamping mechanism comprising a base adapted to support a separate movable work fixture, locating devices carried by said base, separate clamping devices on said base including means holding the devices normally positioned to clamp the fixture so as to prevent movement of the fixture relative to the base during a machining operation on the work, a single operating member, means operatively connecting said locating devices to said operating member so that said devices are actuated simultaneously to position the work fixture on the base by initial movement of the member, means interacting between the clamping devices and said member for holding the clamping devices disengaged from the fixture and operative to release said clamping devices simultaneously after said initial movement has been completed so that said clamping devices are free to clamp the fixture on said base.

2. Locating and clamping mechanism comprising a base adapted to support a separate movable work fixture, locating devices carried by said base, self-operating clamping devices on said base normally operative to clamp said work fixture so as to hold the same fixed on the base while a machining operation is being performed on the work, a single operating member, means operatively connecting said locating devices to said operating member so that said devices are actuated simultaneously to position the work fixture on the base by initial movement of the member, means interacting between the clamping devices and said member engageable with said clamping devices to hold the same positioned to release the work fixture and operative after said initial movement has been completed to release said clamping devices so that the latter are free to clamp the fixture on said base, and means for connecting similar adjacent mechanisms together for mutual operation.

3. Locating and clamping mechanism comprising a base adapted to support a separate movable work fixture, vertical locating bolts carried by and movable upwardly through the top of said base, separate self-operating clamping devices on said base operating to clamp the fixture, a single rotatable operating shaft extending the full length of said base and projecting from opposite ends thereof, rack and pinion means interconnecting said shaft and said bolts and operative to actuate said bolts simultaneously to position the work fixture on the base by initial rotational movement of the shaft in one direction, means interacting between the clamping devices and said shaft for releasing said clamping devices simultaneously to clamp the fixture against said base by rotational movement of said shaft in the mentioned direction but after said initial rotation has been completed, and means on the projecting ends of said shaft for connecting similar adjacent mechanisms together for mutual operation.

4. Locating and clamping mechanism comprising a base adapted to support a separate movable work fixture, locating devices carried by said base, separate self-operating clamping devices on said base, a single rotatable operating shaft extending the full length of said base and projecting from opposite ends thereof, couplings on the projecting ends of said shaft for connecting similar adjacent mechanisms together for mutual operation, means operatively connecting said locating devices to said operating shaft so that said devices are actuated simultaneously to position the work fixture on the base by initial rotational movement of the shaft in one direction, cam means carried by said shaft and engageable with said clamping devices, said cam means interacting between the clamping devices and said shaft for releasing said clamping devices simultaneously to clamp the fixture against said base by rotational movement of said shaft in the mentioned direction but after said initial rotation has been completed.

5. Locating and clamping mechanism comprising a base adapted to support a separate movable work fixture, vertical locating bolts carried by and movable upwardly through the top of said base, separate self-operating clamping devices on said base, a single rotatable operating shaft extending the full length of said base and projecting from opposite ends thereof, rack and pinion means interconnecting said shaft and said bolts operative to actuate said bolts simultaneously to position the work fixture on the base by initial rotational movement of the shaft in one direction, cam means carried by said shaft and engageable with said clamping devices, said cam means interacting between the clamping devices and said shaft for releasing said clamping devices simultaneously to clamp the fixture against said base by rotational movement of said shaft in the mentioned direction but after said initial rotation has been completed.

6. A locating and clamping mechanism comprising a base member having laterally spaced rails; vertically movable locating bolts carried by and projectable upwardly from said base member; racks on said locating bolts; clamping arms surmounting and pivotally attached to said base member between said rails, said arms having outwardly extending jaw portions projecting over and spaced vertically above said rails and inwardly extending arm portions; a pivoted cam below each of said arm portions having an upwardly presented cam surface disposed eccentrically to the cam pivot; pins interposed between and engaging the cam surfaces and said arm portions, said pins actuated by pivotal operation of said cams to rock said clamping arms about their pivots and to move the jaw portions thereof relative to the rails; depending arm portions on said cams; plungers disposed at the outer sides of and engaging the arm portions of said cams; springs behind said plungers biasing the same against said cam arms and normally positioning said cams so as to urge the clamping jaws in the direction of the rails; an actuator shaft journaled for rotation between the arm portions of said cams and laterally of said locating bolts; gear means on and fixed to said shaft engaging the racks on said bolts and operative to project the latter above said base member during initial rotative movement of the shaft in one direction; and cam means on and fixed to the shaft between said cam arm, said cam means being engageable with said arm portions during initial rotative movement of the shaft in the mentioned direction and movable to release said arm portions by a subsequent rotative movement of the shaft in said mentioned direction whereby to permit said spring-biased plungers to actuate said cams to engage said clamping arms.

7. Locating and clamping mechanism comprising a base member having laterally spaced rails; locating mechanism on said base member; clamps surmounting and pivotally attached to said base member between said rails, said clamps having outwardly extending jaw portions projecting over and spaced vertically above said rails and inwardly extending arm portions; pivoted cams beneath said arm portions having upwardly presented cam surfaces disposed eccentrically to the cam pivots; pins interposed between and engaging said cam surfaces and said arm portions, said pins actuated by a pivotal movement of said cams to rock said clamps about their pivots and to move said jaw portions relative to the rails; depending arm portions on said cams; plungers disposed at the outer sides of and engaging the arm portions of said cams; springs behind said plungers biasing the same against said cam arms and normally positioning said cams so as to urge the clamping jaws in the direction of the rails; an actuator shaft journaled for rotation between the arm portions of said cams; means interconnecting the shaft and said locating mechanism operative by initial rotative movement of the shaft in one direction to actuate and engage said locating mechanism; and cam means on and fixed to the shaft between said cam arms, said cam means engageable with said arms during said initial rotative movement of the shaft and movable to release the arms by a subsequent rotative movement of the shaft in said one direction whereby to permit said spring-biased plungers to actuate and engage said clamps.

8. Locating and clamping mechanism comprising a base member having laterally spaced ways; vertically movable locating bolts carried by and projectable upwardly from said base member; racks on said locating bolts; laterally spaced clamping devices on the base having parts engageable with runners or the like traversing said ways and operative to press such runners solidly against the ways so as to hold members carried by or associated with the runners stationary on the base; pivoted cams beneath said clamping devices having upwardly presented cam surfaces disposed eccentrically to the cam pivots; pins interposed between and engaging the cam surfaces and said clamping devices, said pins actuated by pivotal movement of said cams to move said clamping devices between engaged and released positions; depending arm portions on said cams; plungers disposed at the outer sides of and engaging the arm portions of said cams; springs behind said plungers biasing the same against said cam arms and normally positioning said cams so as to hold said clamping devices in engaged position; an actuator shaft journaled for rotation between the arm portions of said cams and laterally of said locating bolts; gear means on and fixed to the shaft engaging the racks on said bolts and operative to project the latter above the base during the initial rotative movement of the shaft in one direction; and cam means on and fixed to the shaft between said cam arms, said cam means being engageable with said arm portions during initial rotative movement of the shaft in the mentioned direction and movable to release said arm portion by subsequent rotative movement of the shaft in said mentioned direction whereby to permit said spring-biased plungers to actuate said cams to engage and to pivot said clamping devices.

9. Locating and clamping mechanism comprising a base having laterally spaced ways; vertically movable locating bolts carried by and projectable upwardly from said base; racks on said locating bolts; clamps surmounting and pivotally attached to said base member between said ways, said clamps having outwardly extending jaw portions projecting over and spaced vertically above said ways and inwardly extending arm portions; means having laterally spaced depending arm portions for rocking said clamps about their pivots to move said jaw portions relative to the ways; plungers disposed at the outer sides of and engaging said depending arm portion; springs behind said plungers biasing the same against said arm portions and normally positioning the same so as to urge the clamping jaws in the direction of the rails; an actuator shaft journaled for rotation between said arm portions laterally of said locating bolts; gear means on and fixed to the shaft engaging the racks on said bolts and operable to project the latter above the base by initial rotative movement of the shaft in one direction; and cam means on and fixed to the shaft between said depending arm portions, said cam means being engageable with said arm portions during said initial rotating movement of the shaft and movable to release said arm portions by subsequent rotative movement of the shaft in said one direction so as to permit said spring-biased plungers to operate and engage said clamps.

10. Locating and clamping mechanism comprising a base having laterally spaced ways; vertically movable locating bolts carried by and projectable upwardly from said base; racks on said locating bolts; clamps surmounting and pivotally attached to said base member between said ways, said clamps having outwardly extending jaw portions projecting over and spaced vertically above said ways and inwardly extending arm portions; a pivoted cam beneath each of said arm portions having upwardly presented cam surfaces disposed eccentrically to the cam pivots; pins interposed between and engaging the cam surfaces and said arm portions, said pins actuated by pivotal movement of said cams to rock said clamps about their pivots and to move said jaw portions relative to the ways; depending arm portions on said cams; spring-biased plungers engaging the arm portions of said cams and normally positioning the latter to urge the clamping jaws in the direction of the ways; an actuator shaft journaled for rotation between the arm portions of said cams and laterally of said locating bolts; gear means on and fixed to the shaft engaging the racks on said bolts and operable to project the latter above said base during initial movement of the shaft in one direction; and cam means on and fixed to the shaft between said cam arms, said cam means engageable with said cam arms during said initial rotative movement of the shaft and movable to disengage the arms by subsequent rotative movement of the shaft in said one direction whereby to permit said spring-biased plungers to operate said clamps so as to move the jaw portions thereof toward the ways.

11. Locating and clamping mechanism comprising a base having laterally disposed ways; vertically movable locating bolts carried by and projectable upwardly from said base; racks on said locating bolts; clamps surmounting and pivotally attached to said base between said ways, said clamps having outwardly extending jaw portions projecting over and spaced vertically above said ways and inwardly extending arm portions; pivoted cams beneath said arm portions having upwardly presented cam surfaces disposed eccentrically to the cam pivots; pins interposed between and engaging the cam surfaces and said arm portions, said pins actuated by a pivotal movement of said cams to rock said clamps about their pivots and to move said jaw portions relative to the ways; a pair of laterally spaced actuator means for said cams normally holding the same positioned to urge said clamping jaws in the direction of said ways; an actuator shaft journaled for rotation between the actuator means of said cams and laterally of said locating bolts; gear means on and fixed to the shaft engaging the racks on said bolts and operable to project the latter above said base during initial rotative movement of the shaft in one direction; and cam means on and fixed to the shaft between said cam-actuator means, said cam means acting against said actuator means during said initial rotative movement of the shaft to hold the clamp released and movable to disengage said actuator means by subsequent rotative movement of the shaft in said one direction so as to permit the actuator means to engage said clamps.

12. Locating and clamping mechanism comprising a base member having laterally spaced ways; vertically movable locating bolts carried by and projectable upwardly from said base member; clamps surmounting and pivotally attached to said base member between said ways, said clamps having outwardly extending jaw portions projecting over and spaced vertically above said ways and inwardly extending arm portions; pivoted cams beneath said arm portions having upwardly presented cam surfaces disposed eccentrically to the cam pivots; pins interposed between and engaging the cam surfaces and said arm portions, said pins actuated by pivotal movement of said cams to rock said clamps about their pivots and to move said jaw portions relative to the ways; depending arm portions on said cams; plungers disposed at the outer sides of and engaging the arm portions of said cams; springs behind said plungers biasing the same against said cam arms and normally positioning said cams so as to urge the clamping jaws in the direction of the ways; an actuator shaft journaled for rotation between the arm portions of said cams and laterally of said locating bolts; and means carried by said shaft for actuating both said locating bolts and said cam arms, said means operable to project the locating bolts above said base and to hold the spring-biased plungers retracted during initial rotative movement of the shaft in one direction and operable to release said plungers by subsequent rotative movement of the shaft in said one direction whereby to permit the plungers to engage said clamps.

13. Locating and clamping mechanism comprising a base having laterally spaced ways for supporting an object traversing said base; locating mechanism for positioning such object on the base; clamping mechanism on the base having parts engageable with such object to hold the same securely in a located position on the base; pivoted actuator means for said clamping mechanism; spring-biased plungers engaging said pivoted actuator means to hold said clamping mechanism in clamping position on the base; a rotatable shaft carried by said base, rack and pinion means interconnecting the shaft and said locating mechanism for transmitting motion from the shaft to said locating mechanism during initial rotating movement of the shaft in one direction; and cam means on and fixed to the shaft engageable with the pivoted actuator means of said clamping mechanism during said initial rotative movement of the shaft and operable by such engagement to hold said clamping mechanism released, said cam means being movable to disengage said pivoted actuators by subsequent rotative movement of the shaft in said one direction whereby to permit said plungers to move said clamping mechanism to clamping position.

14. Locating and clamping mechanism comprising a base having laterally spaced ways thereon; a single, horizontal actuator shaft journaled for rotation in said base; locating mechanism on the base for accurately positioning a fixture supported on said ways; means interconnecting said shaft and said locating mechanism so that the latter is operated by initial rotative movement of the shaft in one direction; clamping mechanism on the base engageable with the fixture to hold the same solidly in the located position; spring-actuated means coactive with said clamping mechanism to hold the same in clamped position; and means carried by said shaft constantly engageable with said clamping mechanism during said initial rotation of the shaft to hold the clamping mechanism released from the fixture, said means releasing said clamping mechanism after said initial rotation of the shaft to permit said spring-actuated means to move said clamping mechanism into clamping position.

15. Locating and clamping mechanism comprising a base; locating devices carried by said base; clamping devices carried by said base and movable between engaged and released positions; spring-biased means engaging said clamping devices urging the same to the clamped position; and a single rotatable actuator for said locating devices and said clamping devices, said actuator including means for actuating said locating devices operable in one position of the actuator to retract said locating devices and a cam engageable with said clamping devices and operable in the mentioned position of the actuator to hold the clamping devices released against the action of said spring-biased means, the actuating means for said locating devices being operative during initial rotative movement of said actuator in one direction from said one position to advance said locating devices, said cam being operative during said initial rotation to maintain said clamping devices released and by continued rotation of the actuator in said one direction to release said clamping devices so that said spring-biased means are rendered operative to actuate the clamping devices.

16. A machine tool having a work station, parallel ways extending through said station, clamping means disposed between said ways, locating means also disposed between said ways, and a generally horizontal platelike guard spaced vertically above and extending over said ways and said locating and clamping mechanisms for preventing chips and the like from falling on the ways and interfering with the operation of said mechanisms.

17. A machine tool having a work station, laterally spaced parallel rails forming ways extending through said station and providing vertical locating surfaces in the station, clamping means disposed between said rails, vertically reciprocable pins disposed between said rails, and a generally horizontal platelike guard covering said clamping mechanism and provided with holes through which said locating pins extend, said guard spaced vertically above and extending over said rails and said locating and clamping mechanisms for preventing chips and the like from falling on the rails or interfering with the operation of said locating and clamping mechanisms.

18. A machine tool having a work station, parallel ways extending through said station, clamping means disposed between said ways, vertical embossments also disposed between said ways, a generally horizontal platelike guard mounted on said embossments and spaced vertically above and extending over both the ways and said clamping mechanisms so as to prevent chips and the like created when the station is in use from falling on the ways or interfering with the operation of the clamping mechanism, and vertically reciprocable locating pins in said embossments projecting upwardly through said guard.

RALPH E. CROSS.

References Cited in the file of this patent
UNITED STATES PATENTS

| Number | Name | Date |
|---|---|---|
| 1,675,150 | Andrew | June 26, 1928 |
| 2,049,842 | Kling | Aug. 4, 1936 |
| 2,193,840 | Pberhoffken et al. | Mar. 19, 1940 |
| 2,302,878 | Muhl et al. | Nov. 24, 1942 |
| 2,392,169 | Mansfield | Jan. 1, 1946 |